(12) United States Patent
Myers

(10) Patent No.: US 8,002,236 B2
(45) Date of Patent: Aug. 23, 2011

(54) REMOTELY CONTROLLED LOCKOUT DEVICE

(75) Inventor: George Jefferson Myers, Akron, OH (US)

(73) Assignee: GEJ, LLC, Akron, OH (US)

( * ) Notice: Subject to any disclaimer, the term of this patent is extended or adjusted under 35 U.S.C. 154(b) by 123 days.

(21) Appl. No.: 11/133,662

(22) Filed: May 20, 2005

(65) Prior Publication Data

US 2006/0260689 A1 Nov. 23, 2006

(51) Int. Cl.
*F16K 35/00* (2006.01)
(52) U.S. Cl. .................. 251/93; 251/110; 251/285
(58) Field of Classification Search .................. 137/385, 137/233; 251/89, 111, 93, 109, 113, 116, 251/67–69, 110, 285; 70/188
See application file for complete search history.

(56) References Cited

U.S. PATENT DOCUMENTS

| 1,276,482 | A | * | 8/1918 | Bowen | 251/109 |
| 1,831,021 | A | * | 11/1931 | Markel | 137/65 |
| 3,935,103 | A | * | 1/1976 | Disque et al. | 210/97 |
| 5,813,655 | A | * | 9/1998 | Pinchott et al. | 251/129.04 |
| 6,843,083 | B2 | * | 1/2005 | Smith et al. | 70/178 |
| 7,117,884 | B2 | * | 10/2006 | Shuter | 137/385 |

* cited by examiner

*Primary Examiner* — John Rivell
*Assistant Examiner* — Atif H Chaudry
(74) *Attorney, Agent, or Firm* — Hahn Loeser & Parks, LLP; John J. Cunniff

(57) ABSTRACT

A remotely controlled lockout device for an in-line gas flow control valve has a control shaft adapted to be operatively connected to a gas flow control valve and operable between a gas flow control valve open and closed position and a rotatable lock member operatively connected to the control shaft and rotatable between a lock member unlocked position in which the control valve is operable between gas flow control valve open and closed positions and a locked position in which the control valve is locked in a gas flow control valve closed position.

19 Claims, 3 Drawing Sheets

US 8,002,236 B2

REMOTELY CONTROLLED LOCKOUT DEVICE

CROSS-REFERENCES

None.

FIELD OF THE INVENTION

This invention relates to a remotely controlled lockout for an in-line gas flow control valve.

BACKGROUND OF THE INVENTION

Most companies that provide natural gas to consumers have a large number of gas meters located inside of residential properties. Access to these-meters is required to disconnect gas service for non-payment of a gas bill or to temporarily disconnect gas service in the event of an emergency or where required for repair of gas lines or equipment. Frequently, gas company personnel are denied access to meters inside of residential properties, particularly where residents are in arrears in payment of their gas bills.

One way to alleviate the problem of access to gas meters is to move the meters from inside a residence to outside. The disadvantage to this approach resides in the fact that it is very expensive to remove and thereafter reinstall a gas meter. Additionally, in order to remove a meter from inside of a residence, it is necessary to shut off gas flow to the inside meter. Typically, this requires cutting off the supply of natural gas to an entire street or to a number of residences on a street.

It is desirable to provide a device which may be operated by gas company personnel to disconnect gas service to a residence having an inside gas meter without requiring access to the inside meter. Preferably, the device would have the capability of interrupting gas service to a residence from a remote location for non-payment of gas bills or as dictated by an emergency or service situation. Additionally, it is desirable that the device operates independently of the gas meter and may be installed easily.

SUMMARY OF THE INVENTION

A remotely controlled lockout device for an in-line gas flow control valve has a control shaft adapted to be operably connected to a gas flow control valve and rotatable between gas flow control valve open and closed positions. A coaxial, rotatable lock member is operably connected to the gas valve control shaft and is rotatable between a lock member unlocked position in which the control shaft is operable between gas flow control valve open and closed positions and a lock member locked position in which the control shaft is locked in the gas flow control valve closed position. A spring attached to the lock member biases the lock member towards its locked position. A remotely controlled actuator is moveable between a first state in which it engages the lock member to retain it in a lock member unlocked position and a second state in which it is disengaged from the lock member which enables the spring to rotate the lock member to the locked position.

DETAILED DESCRIPTION

Figure 1:
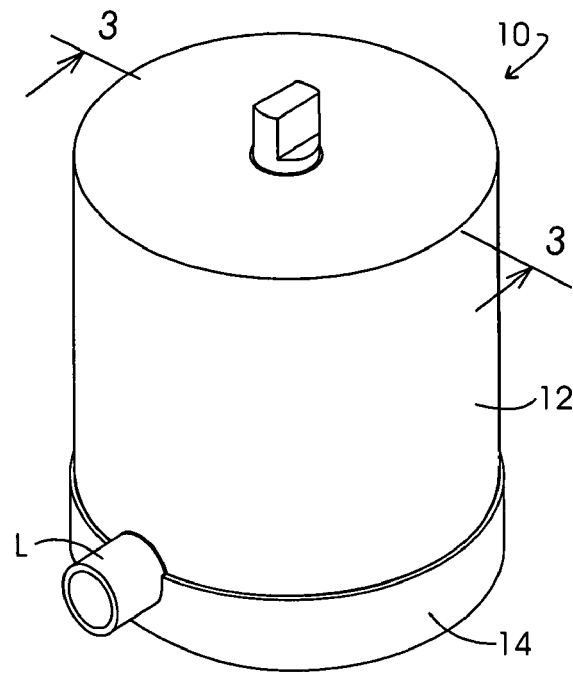
FIG. 1 is a perspective view of the remotely controlled lockout device of the instant invention.
Figure 3:
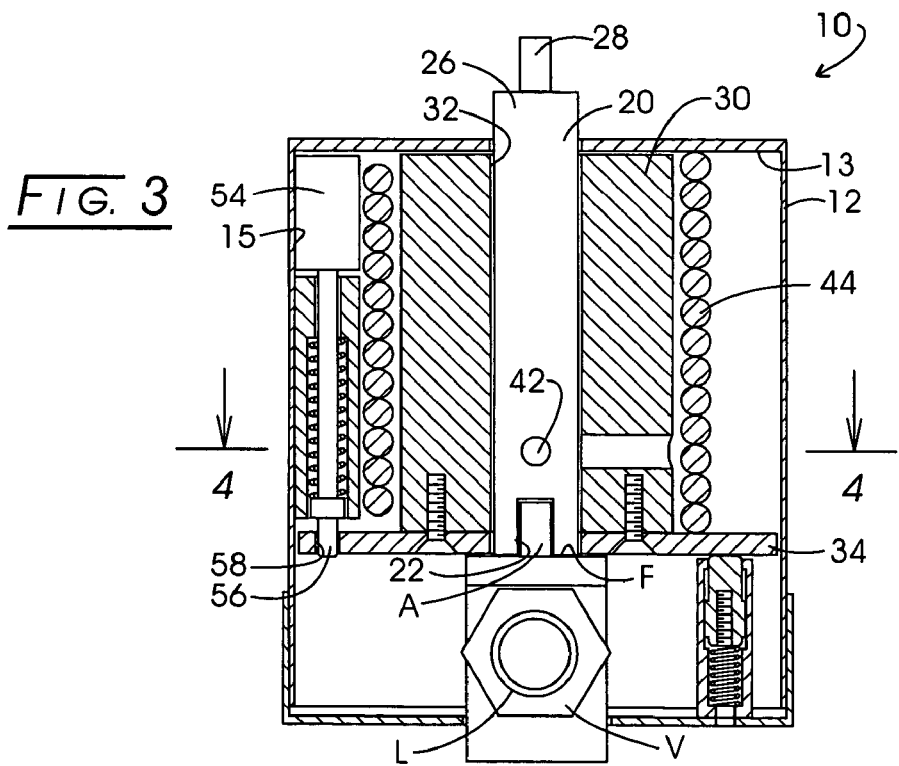
FIG. 3 is a sectional view along line 3-3 of FIG. 1 showing the lockout device in an unlocked position.
Figure 5:
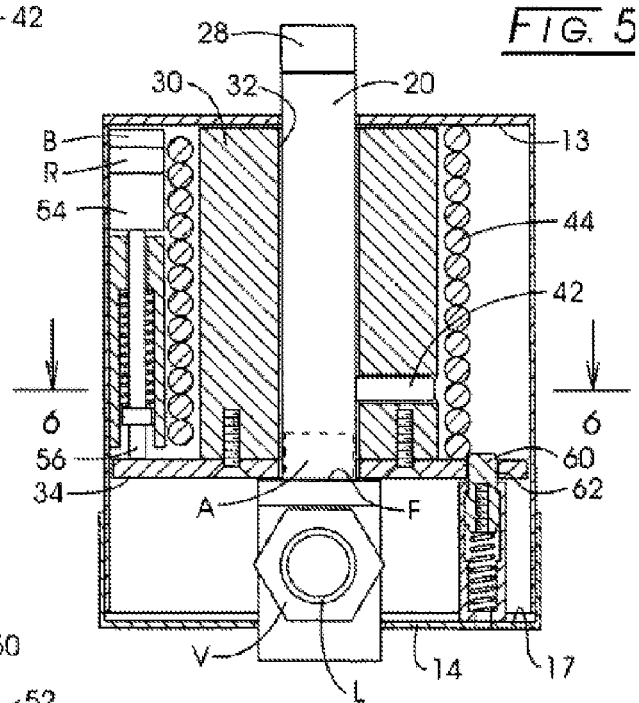
FIG. 5 is a sectional view similar to FIG. 3 showing the lockout device in a locked position.

Referring to FIGS. 1, 3 and 5, the remotely controlled lockout device 10 of the instant invention is shown overlying a gas line L and operatively connected to the actuator shaft A of a gas flow control valve V. The operating mechanism of lockout device 10 is mounted within a generally cylindrical housing or cup 12 closed at one end by a cover or end cap 14. Housing 12 and end cap 14 have generally U-shaped openings 16 and 18 adjacent their open ends to enable them to overly the cylindrical gas line L and to clamp the gas line L and gas valve V there between such that the lockout device 10 is rigidly secured to the gas line L and the gas valve V.

Lockout device 10 has a central, longitudinally extending, axial control member or shaft 20 with a slot 22 at its inner end 24 adapted to receive a complimentary shaped flange of gas valve actuator shaft A. The outer end 26 of control shaft 20 projects outwardly of lockout device housing 12 and has a flange 28 formed thereon which has substantially the same shape as the flange of gas valve actuator shaft A and is aligned parallel thereto. From this it may be seen that rotating the outer end 26 of control shaft 20 by 90 degrees causes gas valve actuator shaft A to rotate a corresponding 90 degrees between a gas flow control valve open position depicted in FIGS. 2, 3 and 4 and a gas flow control valve closed position shown in FIGS. 5 and 6.

It should be noted that a gas valve V is in the open position, meaning that gas can flow through the valve, when the flange of gas valve actuator shaft A is aligned parallel with the gas line L and the gas valve V is in the closed position, meaning gas cannot flow through the gas valve V, when the flange of gas valve actuator shaft A is perpendicular to the gas line L. Additionally, gas valve actuator shafts A typically can rotate only 90 degrees between their open and closed positions, i.e. there are internal stops within the gas valve V which limit the rotation of the gas valve actuator shaft A to a range of about 90 degrees.

A cylindrical lock member 30 has a longitudinally extending axial bore 32 sized to receive control shaft 20. A planar, circular plate 34 having a central bore 36 sized to receive the inner end 24 of control shaft 20 is rigidly attached to and an integral part of lock member 30, as depicted in FIGS. 3 and 5. Additionally, it may be seen that planar, circular plate 34, which defines the inner end of lock member 30, rests against a lateral, planar face F at the base of the flange of actuator shaft A of gas flow control valve V. Thus, lock member 30 is positioned within lockout device housing 12 between lateral face F of gas flow control valve V and the inner surface 13 of the outer end of housing 12.

Figure 2:
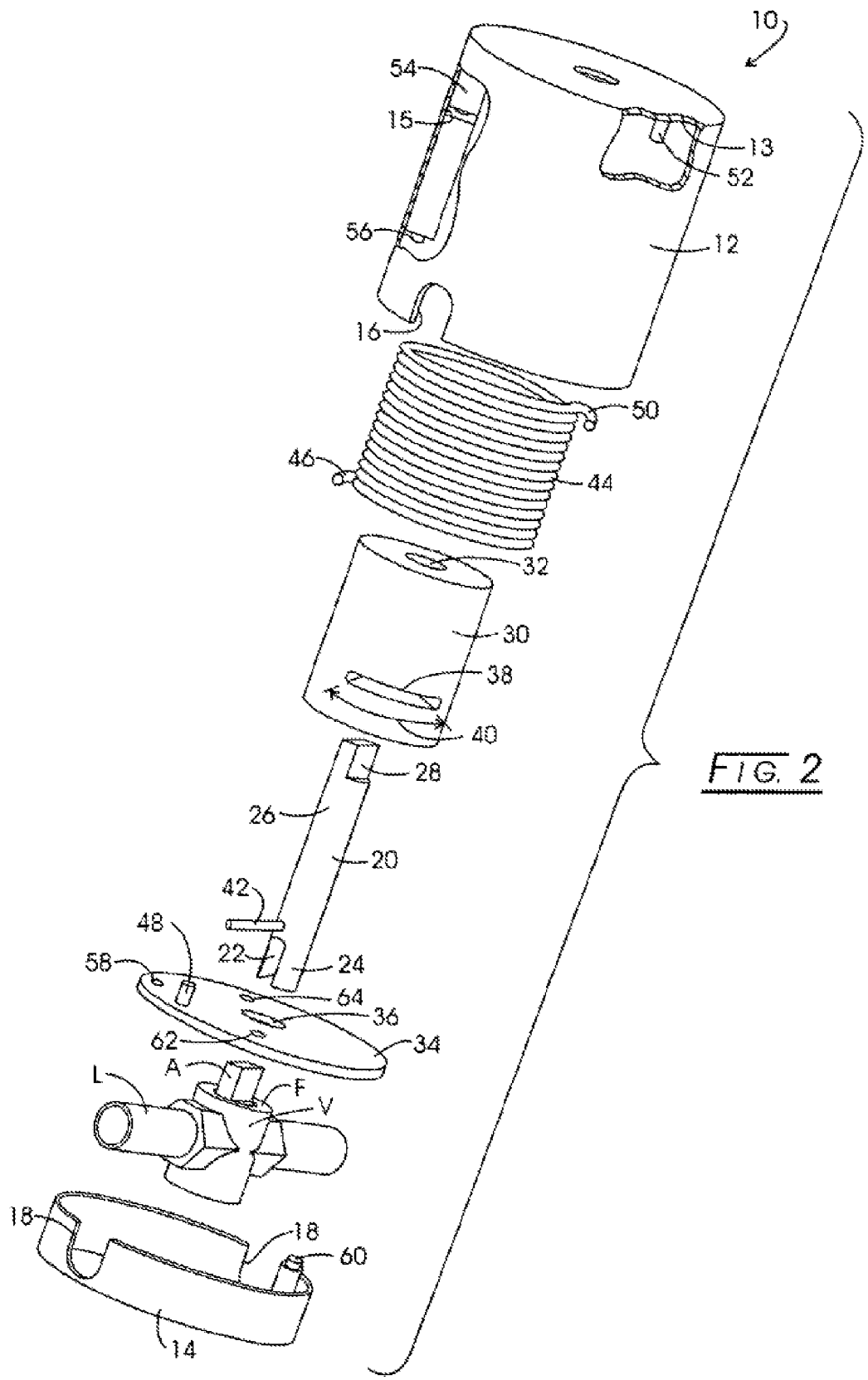
FIG. 2 is a is an exploded view of the remotely controlled lockout device of FIG. 1.

Referring to FIG. 2, it may be seen that lock member 30 has a radial arcuate 90 degree slot, keyhole or opening 38 formed in the side wall thereof Keyhole 38 extends through an arc, identified by the numeral 40, of 90 degrees. The 90-degree arc 40 may be seen in FIGS. 2, 4 and 6.

A key or shear pin 42 projects laterally from the side of control shaft 20 and extends into keyhole 38. Because keyhole 38 extends through a 90 degree arc, control shaft 20 can be rotated 90 degrees between a gas flow control valve V open position and a gas flow control valve V closed position when lock member 30 is in an unlocked position, as will be described in greater detail herein below.

Turning to FIGS. 2 through 6 of the drawings, it may be seen that a torsion spring 44 overlies the external surface of lock member 30 within housing 12. A hook 46 at the inner end of torsion spring 44 engages a lug 48 mounted on the inner surface of lock member planer plate 34. Similarly, a hook 50 at the outer end of torsion spring 44 engages a lug 52 mounted on the inner surface 13 of the outer end of housing 12.

Figure 4:
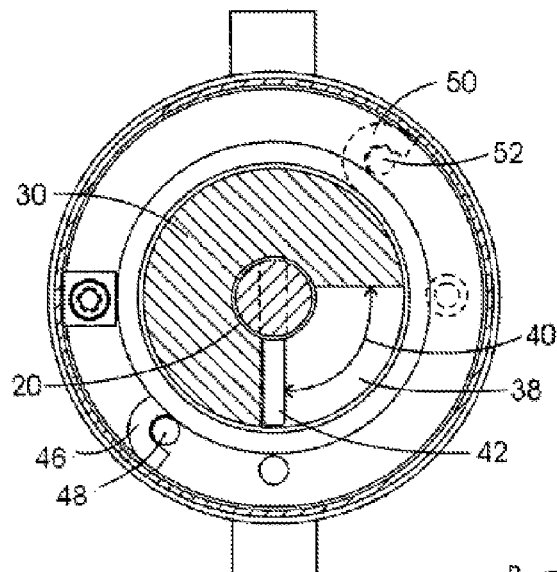
FIG. 4 is a view along line 4-4 of FIG. 3.

In FIGS. 2, 3 and 4, torsion spring 44 is shown in a tightened or twisted condition such that it tends to bias lock member 30 in a counterclockwise direction toward the lock member 30 locked position. Such movement is prevented and lock member 30 is retained in its unlocked position by a remotely controlled solenoid 54 rigidly affixed to the inner cylindrical side wall 15 of housing 12. Solenoid 54 has a power source such as a battery B and a conventional receiver R built in to enable the solenoid to be actuated from a remote location. Solenoid 54 has a spring-biased plunger 56 which resides in a bore 58 formed in planar plate 34 of lock member 30 to retain lock member 30 in the unlocked position. In this position of lock member 30, control shaft 20 may be freely rotated 90 degrees between a gas flow control valve V open position, as shown in FIGS. 3 and 4 and a gas flow control valve V closed position, shown in FIGS. 5 and 6. Referring to FIG. 4, it may be seen that control shaft 20 may be rotated counterclockwise 90 degrees from the gas flow control valve V open position to the gas flow control valve V closed position independently of any rotational movement of lock member 30.

Figure 6:
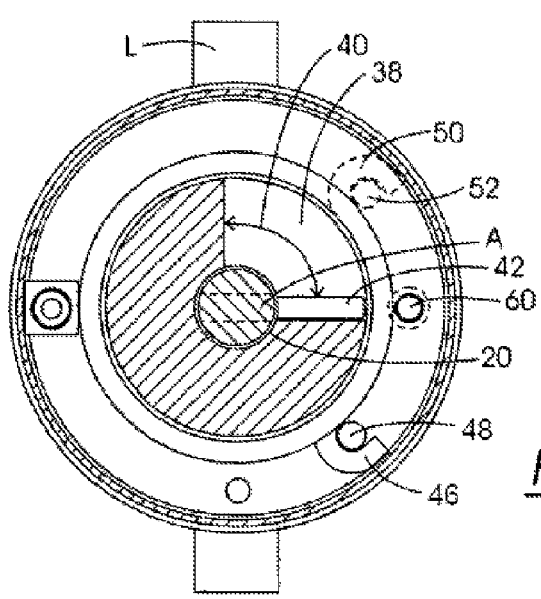
FIG. 6 is a view along line 6-6 of FIG. 5.

In the event of emergency or if the gas company wishes to discontinue gas service to a residence, it may do so by actuating remotely controlled solenoid 54. Typically, this would be accomplished by sending a signal to the receiver R within solenoid 54. When solenoid 54 is actuated, plunger 56 is withdrawn from lock member bore 58. When this occurs, torsion spring 44 causes lock member 30 to rotate 90 degrees counterclockwise to the locked position, illustrated in FIGS. 5 and 6. Rotational movement of lock member 30 also causes key 42 and control shaft 20 to rotate 90 degrees counterclockwise from the position depicted in FIG. 4 to the position depicted in FIG. 6. Consequently, gas valve actuator A is moved to a position perpendicular to that of gas line L, as seen in FIG. 6, and the flow of gas is interrupted.

Upon rotation of lock member 30 through an angle of 90 degrees, a spring-biased plunger 60 rigidly affixed to the inner end surface 17 of end cap 14 enters a bore 62 in planar plate 34 of lock member 30. (Bore 62 is separated from bore 58 by a counterclockwise arc of 90 degrees.) This secures lock member 30 in its locked position and prevents rotation of control shaft 20 if a torque is applied to flange 28 at the outer end of control shaft 20 in an attempt to rotate control shaft 20 and lock member 30 clockwise to the unlocked position of lock member 30. In fact, key 42 acts as a shear pin and will break in the event a maximum pre-set torque is applied to flange 28 of control shaft 20, in an attempt to move lock member 30 out of its locked position, depicted in FIGS. 5 and 6. It should be noted that plunger 60 will withstand a far greater torque applied to lock member 30 prior to failure than will key 42.

As stated above, subsequent to the operation of remotely controlled solenoid 54 and the resultant movement of lock member 30 to the locked position, control shaft 20 cannot be operated to return gas valve actuator A to the gas flow control valve V open position. In fact, the remotely controlled lockout device 10 must be removed from gas line L and gas valve V by a technician and reset to the lock member 30 unlocked position, depicted in FIGS. 3 and 4, before gas valve actuator A can move to a gas valve open position.

In some instances it may be desirable to make lockout device 10 resettable to the lock member 30 unlocked position by remote control without removing the lockout device 10 from the gas line L and gas valve V and enable a resident or service personnel at the location of the lockout device 10 to reset the device to an unlocked condition. To accomplish this, a bore 64 is formed in planar plate 34 of lock member 30. Bore 64 is separated from bore 58 by a clockwise arc of 90 degrees and is the same radial distance from the center of bore 36 as bore 58 and is the same diameter as bore 58. When solenoid 54 is actuated and plunger 56 is momentarily withdrawn from bore 58 to thereby enable spring 44 to move lock member 30 to its locked position, lock member 30 will rotate counterclockwise 90 degrees, as viewed in FIG. 2. In this position bore 64 is aligned with spring-biased plunger 56 such that plunger 56 will enter bore 64 and secure lock member 30 in the locked position in the same manner as plunger 60. Thereafter, actuating solenoid 54, which may be accomplished from a remote location, will withdraw plunger 56 from bore 64 to allow lock member 30 to be rotated clockwise to its unlocked position by applying a manual clockwise torque to control shaft 20. Of course, shear pin or key 42 must have sufficient strength to overcome the force of torsion spring 44 as control shaft 20 is rotated in order to move lock member 30 to its unlocked position. Additionally, in this instance, spring-biased plunger 60 would not be utilized. It should be noted that the internal stops in a gas flow control valve V act to prevent rotation of lock member 30 beyond a 90-degree arc.

Various changes may be made to the size, shape, and relative proportions of the different invention elements disclosed and described herein without departing from the scope, meaning, or intent of the claims which follow.

I claim as my invention:

1. A remotely controlled lockout device for an in-line gas flow control valve comprising:

a housing;

a control shaft within said housing adapted to be operatively connected to a gas flow control valve and operable between gas flow control valve open and closed positions;

a rotatable lock member within said housing operatively connected to said control shaft and rotatable between a lock member unlocked position in which said control shaft is operable between gas flow control valve open and closed positions and a lock member locked position in which said control shaft is locked in said gas flow control valve closed position;

biasing means attached to said lock member biasing said lock member toward said lock member locked position;

a remotely controlled actuator including a receiver for receiving a signal from a remote location, the remotely controlled actuator being movable between a first state in which it engages said lock member to retain said lock member in said lock member unlocked position and a second state in which it disengages said lock member to enable said biasing means to rotate said lock member to said lock member locked position, wherein subsequent to the operation of the remotely controlled actuator and movement of the lock member to said lock member locked position, the lock member is retained in its lock member locked position either by engagement of the lock member by a lock member retainer or by reengagement of the remotely controlled actuator with the lock member.

2. The remotely controlled lockout device of claim 1 further comprising a pin attached to said control shaft and projecting laterally therefrom, an arcuate slot formed in said lock member which receives said pin, and said pin being movable within said arcuate slot by said control shaft between said gas flow control valve open and closed positions when said lock member is in said lock member unlocked position and said pin being immovable within said arcuate slot and retained in said gas flow control valve closed position when said lock member is in said lock member locked position.

3. The remotely controlled lockout device of claim 1 wherein said housing has a cut out portion for receiving said gas line and clamping said lockout device to said gas line and said gas valve.

4. The remotely controlled lockout device of claim 1 further comprising an end cap attached to said housing.

5. The remotely controlled lockout device of claim 4, wherein the housing and end cap cooperate to surround said gas flow control valve such that the remotely controlled lockout device is rigidly secured to said gas flow control valve.

6. The remotely controlled lockout device of claim 5, wherein the remotely controlled actuator additionally includes a solenoid.

7. The remotely controlled lockout device of claim 1, additionally comprising a retaining means which engages said lock member and retains said lock member in said lock member locked position subsequent to said remotely controlled actuator moving from said first state to said second state.

8. The remotely controlled lockout device of claim 1, wherein the remotely controlled actuator includes a solenoid.

9. A remotely controlled lockout device for an in-line gas flow control valve comprising:
  a housing;
  a control shaft within said housing adapted to be operatively connected to a gas flow control valve and operable between gas flow control valve open and closed positions;
  a coaxial rotatable lock member within said housing having a central axial bore which receives said control shaft and rotatable between a lock member unlocked position in which said control shaft is operable between gas flow control valve open and closed positions and a lock member locked position in which said control shaft is locked in said gas flow control valve closed position;
  a slot formed in one of said lock member and said control shaft;
  a pin mounted in the other of said lock member and said control shaft and received in said slot to operatively connect said lock member and said control shaft;
  a spring attached to said lock member and biasing said lock member toward said lock member locked position;
  a remotely controlled actuator moveable between a first state in which it engages said lock member to retain said lock member in said lock member unlocked position and a second state in which it disengages said lock member and biasing means rotates said lock member to said lock member locked position;
  wherein said housing surrounds said in-line gas flow control valve; and
  wherein subsequent to the operation of the remotely controlled actuator and movement of the lock member to said lock member locked position, the lock member is retained in its lock member locked position either by engagement of the lock member by a lock member retainer or by reengagement of the remotely controlled actuator with the lock member.

10. The remotely controlled lockout device of claim 9, wherein the remotely controlled actuator includes a receiver for receiving a signal from a remote location.

11. The remotely controlled lockout device of claim 10, wherein the remotely controlled actuator additionally includes a solenoid.

12. The remotely controlled lockout device of claim 9, wherein the remotely controlled actuator includes a solenoid.

13. A remotely controlled lockout device for an in-line gas flow control valve comprising:
  a housing;
  a control shaft within said housing adapted to be operatively connected to a gas flow control valve and operable between gas flow control valve open and closed positions;
  a coaxial rotatable lock member within said housing having a central axial bore which receives said control shaft and rotatable between a lock member unlocked position in which said control shaft is operable between gas flow control valve open and closed positions and a lock member locked position in which said control shaft is locked in said gas flow control valve closed position;
  an arcuate slot extending at least 90 degrees formed in said lock member;
  a pin mounted on said control shaft and received in said slot to operatively connect said lock member and said control shaft;
  wherein said pin is freely moveable in said slot and said control shaft is operable between said gas flow control valve open and closed positions when said lock member is in said lock member unlocked position and said pin is prevented from moving in said slot and said control shaft is locked in said gas flow control valve closed position when said lock member is in said lock member locked position;
  a spring attached to said lock member and biasing said lock member toward said lock member locked position;
  a remotely controlled actuator moveable between a first state in which it engages said lock member to retain said lock member in said lock member unlocked position and a second state in which it disengages said lock member to enable said spring to rotate said lock member to said lock member locked position; and
  a retaining means which engages said lock member and retains said lock member in said lock member locked position subsequent to said remotely controlled actuator moving from said first state to said second state;
  wherein said housing is adapted to surround said in-line gas flow control valve, said rotatable lock member, said biasing means and said remotely controlled actuator, and
  wherein subsequent to the operation of the remotely controlled actuator and movement of the lock member to said lock member locked position, the lock member is retained in its lock member locked position either by engagement of the lock member by a lock member retainer or by reengagement of the remotely controlled actuator with the lock member.

14. The remotely controlled lockout device of claim 13, wherein the remotely controlled actuator includes a receiver for receiving a signal from a remote location.

15. The remotely controlled lockout device of claim 14, wherein the remotely controlled actuator additionally includes a solenoid.

16. The remotely controlled lockout device of claim 13, wherein the remotely controlled actuator includes a solenoid.

17. A remotely controlled lockout device for an in-line gas flow control valve comprising:
- a housing;
- a control shaft within said housing adapted to be operatively connected to a gas flow control valve and operable between gas flow control valve open and closed positions;
- a coaxial rotatable lock member within said housing having a central axial bore which receives said control shaft and rotatable between a lock member unlocked position in which said control shaft is operable between gas flow control valve open and closed positions and a lock member locked position in which said control shaft is locked in said gas flow control valve closed position;
- an arcuate slot extending at least 90 degrees formed in said lock member;
- a pin mounted on said control shaft and received in said slot to operatively connect said lock member and said control shaft;
- wherein said pin is freely moveable in said slot and said control shaft is operable between said gas-flow control valve open and closed positions when said lock member is in said lock member unlocked position and said pin is prevented from moving in said slot and said control shaft is locked in said gas flow control valve closed position when said lock member is in said lock member locked position;
- a spring attached to said lock member and biasing said lock member toward said lock member locked position; and
- a remotely controlled actuator moveable between a first state in which it engages said lock member to retain said lock member in said lock member unlocked position and a second state in which it engages said lock member to retain said lock member in said lock member locked position;
- wherein said housing surrounds said in-line gas flow control valve; and
- wherein subsequent to the operation of the remotely controlled actuator and movement of the lock member to said lock member locked position, the lock member is retained in its lock member locked position either by engagement of the lock member by a lock member retainer or by reengagement of the remotely controlled actuator with the lock member.

18. The remotely controlled lockout device of claim 17, wherein the remotely controlled actuator includes a receiver for receiving a signal from a remote location.

19. The remotely controlled lockout device of claim 18, wherein the remotely controlled actuator additionally includes a solenoid.

* * * * *

UNITED STATES PATENT AND TRADEMARK OFFICE
CERTIFICATE OF CORRECTION

| | | |
|---|---|---|
| PATENT NO. | : 8,002,236 B2 | Page 1 of 1 |
| APPLICATION NO. | : 11/133662 | |
| DATED | : August 23, 2011 | |
| INVENTOR(S) | : Meyers | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Twenty-second Day of January, 2013

David J. Kappos
*Director of the United States Patent and Trademark Office*